United States Patent Office.

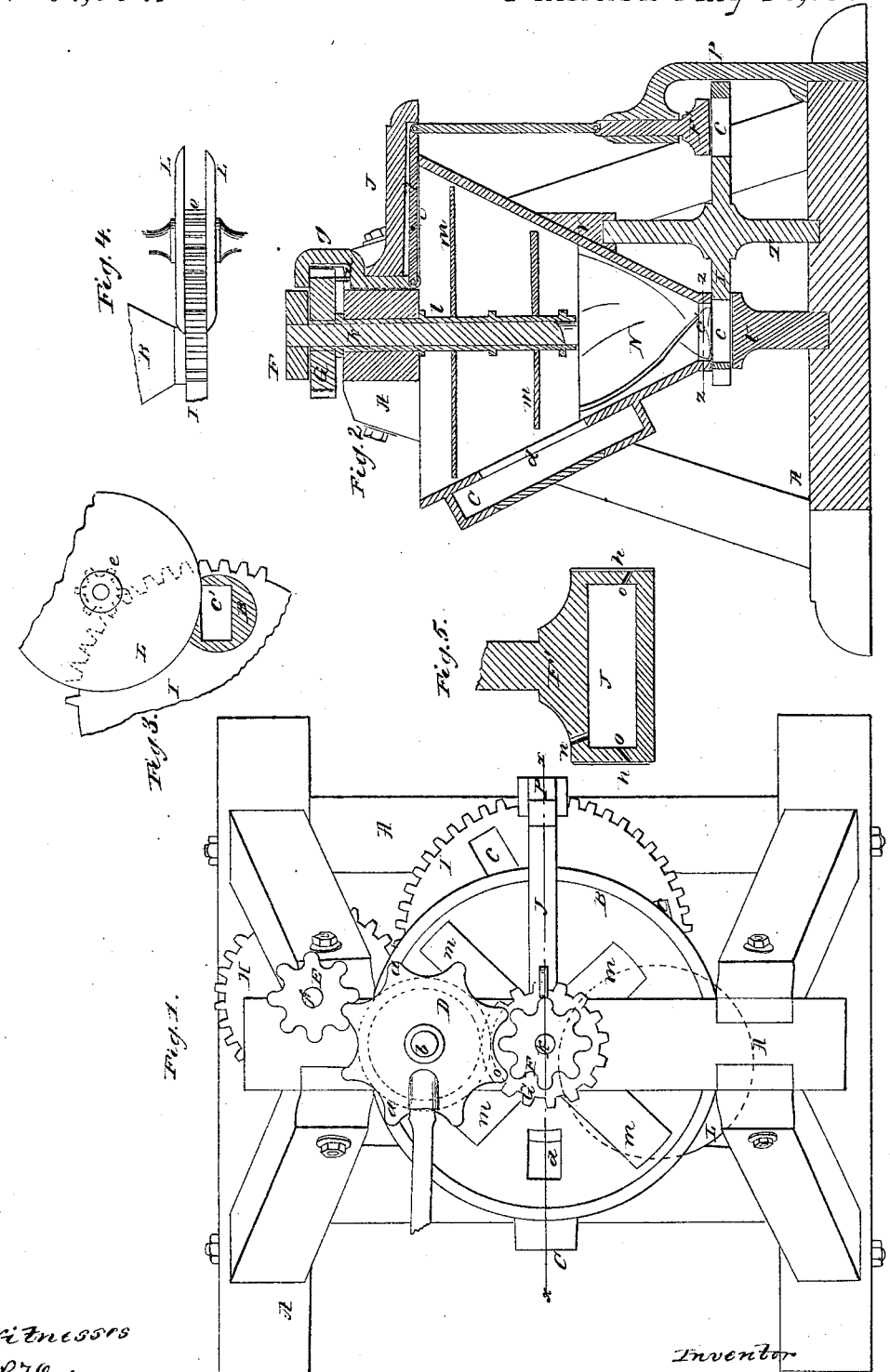

J. A. WELSH, OF XENIA, OHIO, ASSIGNOR TO HIMSELF, B. D. ANDERSON, R. S. FINLEY, SOLOMON K. HARNER, WILLIAM H. WILSON, AND CHAUNCEY W. NEWTON, OF THE SAME PLACE.

Letters Patent No. 67,007, dated July 23, 1867.

IMPROVED BRICK MACHINE.

*The Schedule referred to in these Letters Patent and making part of the same.*

TO ALL WHOM IT MAY CONCERN:

Be it known that I, J. A. WELSH, of Xenia, in the county of Green, and State of Ohio, have invented certain new and useful Improvements in Brick Machines; and I do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use my invention, I will proceed to describe it.

My invention consists in a novel construction of a machine for making bricks, in which the clay is ground in a conical vertical hopper, and then pressed by a screw through the mouth of said hopper into moulds in a horizontal wheel underneath, and the surfaces of the bricks while in said moulds being cut off even and smooth by revolving disks, and then automatically removed from the moulds.

Figure 1 is a top plan view.

Figure 2, a transverse vertical section taken on the line $xx$ of fig. 1.

Figures 3, 4, and 5, are views of portions detached and shown more in detail.

A represents the frame, which may be constructed of any suitable material and size, the form here shown being preferred on account of its strength and simplicity. Within this frame I mount a conical hopper, B, and locate therein a series of arms, $m$, for grinding the clay; said arms projecting radially from a hollow shaft, $l$, which extends up through the top of the frame and has a cog-wheel, G, secured thereon, as shown in fig. 2. Another shaft, $k$, extends down through the hollow shaft $l$, and has attached to its lower end, below the arms $m$, a spirally flanged wheel or screw, N, which is made of a size to fit and revolve in the lower portion of the hopper B for the purpose of forcing the ground clay out at the bottom of the hopper. Upon the upper end of this shaft $k$ is secured a gear-wheel, F, arranged to gear with the driving-wheel D, which revolves on a journal, $b$, on the top of the frame, there being another wheel, O, under the wheel D, which latter turns with the driving-wheel D, and gears into and drives the wheel G on shaft $l$. Attached to one side of the hopper is a box, C, with an opening, $d$, communicating from the hopper into it. This is for the purpose of receiving and containing the stones which may be in the clay, they being worked out by the arms $m$. The box has a lid that can be opened, when desired. A large circular table or wheel, I, of a thickness equal to the thickness of the brick, is located in the lower portion of the machine, in such a position that as it revolves a series of holes formed therein, to answer as moulds for the bricks, will be brought successively under the mouth of the hopper to receive the clay as it is forced out by the screw N, the lower end of the shaft T of this wheel I, resting in the frame, and its upper end being journalled in a projection or block, V, secured to the side of the hopper, as represented in fig. 2. This wheel or table I is provided with teeth on its periphery, and is driven by a gear-wheel, H, secured to a shaft, $f$, which extends up through the frame, and has a gear-wheel, E, secured to its upper end, and arranged to be driven by the driving-wheel D, as shown in fig. 1. On the opposite side of the machine on a vertical shaft, not shown, are mounted two circular disks, L, as represented in figs. 3 and 4, these disks having their inner faces made straight, and being bevelled on their outer surface at the periphery so as to form edges more or less sharp, as shown in fig. 4. These disks are arranged so as to enclose between them a portion of the table I, as represented in fig. 4; the disks L being of sufficient diameter to extend far enough on to the table to cover the moulds $c$ formed therein, as shown in fig. 5, where a portion of the table I and of one disk is shown. A pinion, $e$, is secured between the disks L, and arranged to gear with the teeth on the periphery of the table I, so that as the latter revolves the disks have imparted to them a rotary motion also. Attached to one side of the frame is a post or support, P, as shown in fig. 2, the upper end of which serves as a guide for a plunger, F', which is suspended from a pivoted rod, $t$, in the under side of arm J, in such a position as to be directly over the circle of moulds $c$, as the latter are brought under it by the revolution of the table I. The rod $t$ is pivoted at $i$, and to its inner end is pivoted a bent rod or yoke, $g$, the under horizontal arm of which rests under the wheel G, where it is hit and depressed by an incline, $u$, secured to the under side of wheel G, there being one of these inclines for each cell in the table I. When the incline $u$ thus depresses the inner end of rod $t$, the outer end is thereby raised, which draws the follower F' up out of the mould $c$, permitting the table I to resume its motion, the follower F resting upon the face of the table until the next cell comes under it, when it drops in and forces out the brick, after which it is again raised by the incline $u$ and the table goes on again. This follower F I make hollow to contain oil, which is poured in through an opening, $n$. Around the follower I secure a strip of cloth, $h$, fig. 5, or other similar material, which is kept saturated with oil which seeps out through openings $o$ in the sides, as represented in the drawing. The object of this arrangement is to clean the mould and also to grease it so that the brick will not adhere to it. It will be seen by examining fig. 3, which is a view taken on the line $z$–$z$, fig. 2, that the mouth of the hopper is made rectangular, of the form, and a very little smaller than the brick is intended to be. By fig. 2 it will be seen that when the cell $c$ is brought under the hopper mouth the column of clay that will be forced down through the open mouth will be a little smaller than the cell, so that the clay may enter the cell without coming in contact with the sides of the cell and rubbing off the oil. When, however, the clay strikes against the block U under the cell it will be spread out sidewise in all directions until the mould is completely filled. It will be observed that the driving-wheel D has its teeth $a$ at much greater distances apart than are the teeth of the corresponding wheels E and F which are driven by it, the teeth themselves being of the same size. The object of this is to permit the driving-wheel D to have a continuous motion and at the same time impart to the table I and the screw N an intermittent motion. The object of this is to have the table remain stationary while the clay is being forced into the cell $c$, and the brick forced out by the follower F′, and also to permit the screw to remain stationary during the interval while another mould is being brought under the mouth of the hopper to be filled.

The operation is as follows: The hopper being supplied with clay and the machine set in motion, the table I revolves until one of the cells comes under the mouth of the hopper, when it is instantly filled, and the table I resumes its motion, carrying the brick in the mould along between the revolving disks, which cut off both its upper and lower faces flush with the surfaces of the table I. As the table continues to revolve the brick is brought under the follower or plunger, which, by its weight, pushes it out of the mould, when the plunger is drawn out of the mould, and the operation proceeds, as before, in a continuous manner. By these means I produce a machine that makes brick of excellent quality and with rapidity.

Having thus described my invention, what I claim, is—

1. The conical hopper B, having the box C on its side, with an opening, $d$, leading therein, substantially as and for the purpose set forth.

2. The combination of hopper B, having its mouth rectangular in form, corresponding to the shape of the side of the brick, and slightly smaller than the mould which is to receive and form the brick, with the rotary table I, having the mould $c$ formed therein, when arranged to operate substantially as described.

3. In combination with a series of movable moulds, I claim the use of one or more rotating disks for cutting off the clay, and smoothing or forming the surface of the brick.

4. In combination with the rotating table I, having the moulds $c$ formed therein, I claim the stationary table U, when arranged to support the clay in the mould while being pressed in from the hopper as set forth.

5. So arranging the table I and the screw N that each shall have an intermittent movement alternately, to permit the wheel to remain stationary while the screw is pressing the clay into the mould, and the screw then remain stationary while the table is rotating to remove the filled mould and present an empty one, substantially as described.

6. I claim the plunger F′, when arranged to operate in connection with the table I, as set forth, for the purpose of removing the bricks from the moulds after being pressed, substantially as set forth.

7. The reservoir J in the interior of the plunger, having the openings $o$ for the gradual escape of the oil for saturating the cloth $h$, and oiling the moulds, as described.

8. The combination and arrangement of the driving-wheel D, when constructed as described, with the wheels E and F, for the purpose of imparting to the screw N and the table I intermittent motions, as herein described.

J. A. WELSH.

Witnesses:
P. T. DODGE,
W. C. DODGE.